(12) United States Patent
Chalk et al.

(10) Patent No.: US 11,914,212 B2
(45) Date of Patent: Feb. 27, 2024

(54) INTERMITTENTLY BONDED RIBBON HAVING BONDING REGIONS WITH MULTIPLE MATERIALS

(71) Applicant: CORNING RESEARCH & DEVELOPMENT CORPORATION, Corning, NY (US)

(72) Inventors: Julie Ann Chalk, Hickory, NC (US); David Wesley Chiasson, Edmonton (CA); Gregory Alan Mills, Clemmons, NC (US); Bin Yang, Shanghai (CN); Xiaomin Zhao, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/844,132

(22) Filed: Jun. 20, 2022

(65) Prior Publication Data

US 2022/0317400 A1 Oct. 6, 2022

Related U.S. Application Data

(63) Continuation of application No. PCT/US2020/063185, filed on Dec. 4, 2020.
(Continued)

(51) Int. Cl.
*G02B 6/44* (2006.01)

(52) U.S. Cl.
CPC .................................. *G02B 6/448* (2013.01)

(58) Field of Classification Search
CPC ........................................................ G02B 6/448
(Continued)

(56) References Cited

U.S. PATENT DOCUMENTS

| 9,389,386 B2 | 7/2016 | Matsuzawa et al. |
| 9,880,368 B2 | 1/2018 | Debban et al. |
| (Continued) | | |

FOREIGN PATENT DOCUMENTS

| WO | 2019/010291 A1 | 1/2019 |
| WO | 2019/011417 A1 | 1/2019 |
| WO | 2019/069537 A1 | 4/2019 |

OTHER PUBLICATIONS

International Search Report and Written Opinion of the International Searching Authority; PCT/US2020/063185 dated Mar. 18, 2021, 9 pages; US Patent Office.

*Primary Examiner* — Jerry M Blevins
(74) *Attorney, Agent, or Firm* — Thomas R. Irwin (57) ABSTRACT

Embodiments of the disclosure relate to an optical fiber ribbon. The optical fiber ribbon includes a plurality of optical fibers arranged adjacently to each other and a plurality of bonding regions intermittently spaced along a length of the optical fiber ribbon. At each bonding region, at least one bond is formed between two optical fibers of the plurality of optical fibers. Further, the at least one bond comprises a first material applied to outer surfaces of the two optical fibers and a second material applied over the first material. The first material is different from the second material, and at least one of the first material or the second material includes a colorant configured to identify the optical fiber ribbon. Also disclosed are embodiments of making such an optical fiber ribbon as well as of optical fiber cables including such an optical fiber ribbon.

20 Claims, 5 Drawing Sheets

Related U.S. Application Data (60) Provisional application No. 62/952,649, filed on Dec. 23, 2019.

(58) Field of Classification Search
 USPC .......................................................... 385/114
 See application file for complete search history.

(56) References Cited

U.S. PATENT DOCUMENTS

| | | | |
|---|---|---|---|
| 2003/0223713 A1 | 12/2003 | Chiasson et al. | |
| 2010/0135625 A1* | 6/2010 | Overton | C03C 25/106 385/114 |
| 2017/0219792 A1 | 8/2017 | Debban et al. | |
| 2018/0273427 A1* | 9/2018 | Tanaka | C03C 25/105 |
| 2019/0179094 A1 | 6/2019 | Chiasson et al. | |
| 2019/0293886 A1 | 9/2019 | Chiasson et al. | |
| 2020/0292771 A1* | 9/2020 | Sekine | G02B 6/448 |

* cited by examiner

INTERMITTENTLY BONDED RIBBON HAVING BONDING REGIONS WITH MULTIPLE MATERIALS

PRIORITY APPLICATION

This application is a continuation of International Patent Application No. PCT/US2020/063185 filed Dec. 4, 2020, which claims the benefit of priority of U.S. Provisional Application No. 62/952,649, filed on Dec. 23, 2019, the content of which is relied upon and incorporated herein by reference in its entirety.

BACKGROUND

The disclosure relates generally to optical fibers, and specifically to optical fiber ribbons in which the optical fibers are intermittently bonded together along the length of the optical fiber ribbon. A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or ribbons, may be color coded for the purposes of identification when making such connections. Further, the optical fiber cable may contain optical fibers arranged in ribbons to allow for multiple optical fibers to be fusion spliced together in a single operation.

SUMMARY

Embodiments of the disclosure relate to an optical fiber ribbon. The optical fiber ribbon includes a plurality of optical fibers arranged adjacently to each other and a plurality of bonding regions intermittently spaced along a length of the optical fiber ribbon. At each bonding region, at least one bond is formed between two optical fibers of the plurality of optical fibers. Further, the at least one bond comprises a first material applied to outer surfaces of the two optical fibers and a second material applied over the first material. The first material is different from the second material, and at least one of the first material or the second material includes a colorant configured to identify the optical fiber ribbon.

Additional embodiments of the disclosure relate to a method of preparing an optical fiber ribbon. In the method, a plurality of optical fibers are arranged adjacent to each other along a length of the optical fiber ribbon. At least one layer of a first material is intermittently deposited into at least one interstice between two adjacent optical fibers of the plurality of optical fibers to create bonding regions along the length of the optical fiber ribbon. At least one layer of a second material is intermittently deposited over the first material in the bonding regions. The first material is different from the second material.

Further embodiments of the disclosure relate to an optical fiber ribbon. The optical fiber ribbon includes a plurality of optical fibers comprising intermittent bonds along a length of the optical fiber ribbon. The intermittent bonds are made of a first material disposed on outer surfaces of adjacent optical fibers of the plurality of optical fibers and a second material disposed on the first material. The second material is different from the first material. The plurality of optical fibers comprise a first longitudinal cross-sectional configuration in which the plurality of optical fibers are substantially planar, and the plurality of optical fibers comprise a second longitudinal cross-sectional configuration in which the plurality of optical fibers are curled.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an optical fiber ribbon having intermittent, multilayer bonding regions as well as methods for producing such an optical fiber ribbon are provided. As described herein, the optical fiber ribbons according to the present disclosure are flexible such that the ribbons can be rolled, curled, or folded from the planar configuration conventionally associated with optical fiber ribbons to a more space-saving configuration. In this way, the ribbons can be carried in cables having smaller diameters, and/or the cables can have a higher fill ratio (i.e., fraction of cross-sectional area filled with optical fibers). Further, despite only being intermittently joined, the bonding regions still allow for incorporation of identifying characteristics through the deposition of at least two materials in the bonding regions. For example, one material may provide the requisite bonding characteristics to join adjacent optical fibers, whereas another material may be a color layer to provide identification of the ribbon. Still further, the materials used in the bonding region may provide additional functionality, such as a friction reduction layer. Advantageously, the intermittent bonding regions can be applied using continuous deposition techniques, such as continuous inkjet printing, which prints at speeds sufficient to allow for incorporation of the intermittent bonding technique into commercial processing lines. Each of these exemplary embodiments will be described in greater detail below, and these exemplary embodiments are provided by way of illustration, and not by way of limitation. These and other aspects and advantages will be discussed in relation to the embodiments provided herein.

Figure 1:
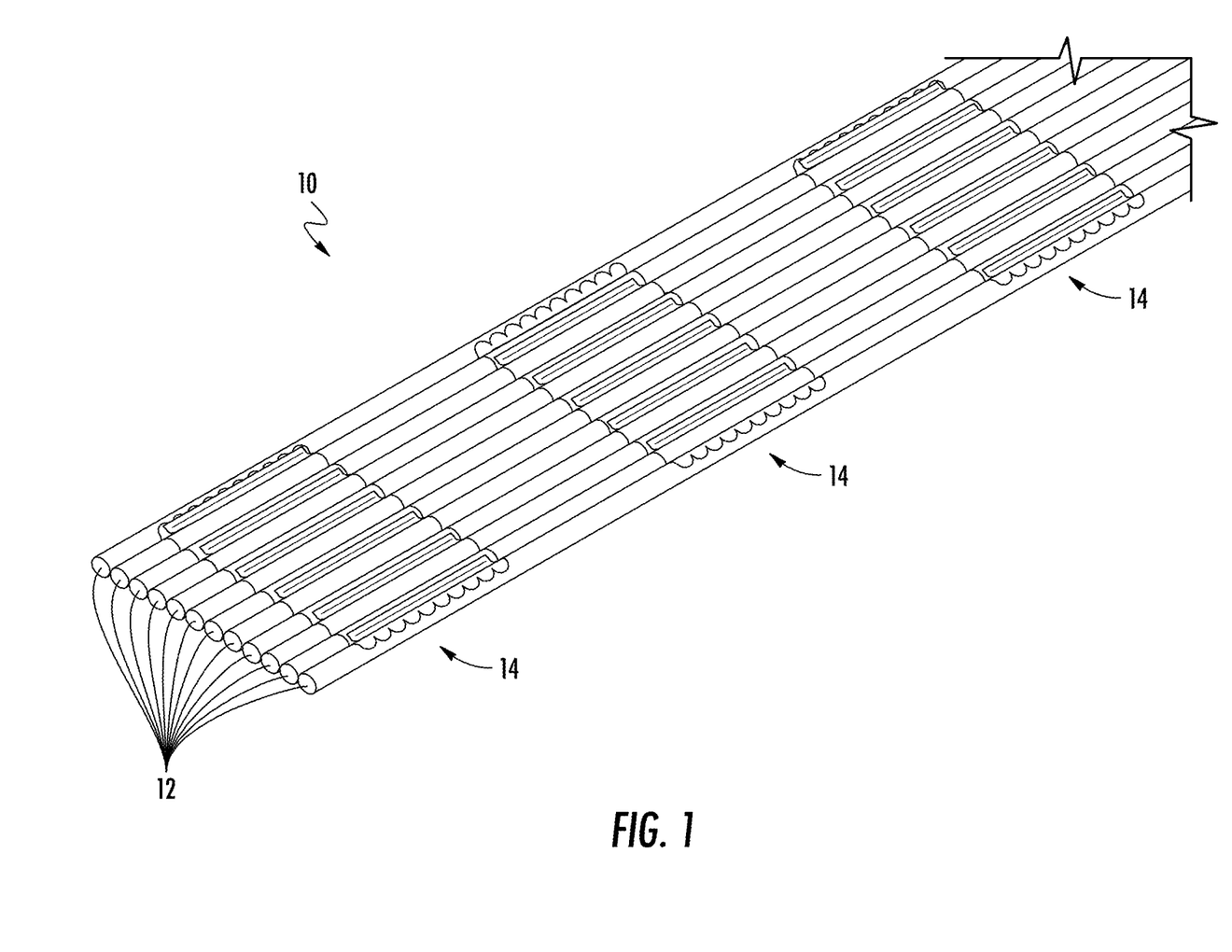
FIG. 1 is partial, perspective view of an intermittently bonded optical fiber ribbon, according to an exemplary embodiment.

FIG. 1 depicts an exemplary embodiment of an optical fiber ribbon 10 according to the present disclosure. The optical fiber ribbon 10 includes a plurality of optical fibers 12. In the embodiment depicted, the optical fiber ribbon 10 includes twelve optical fibers 12. In embodiments, the number of optical fibers 12 contained in the optical fiber ribbon 10 varies from four to thirty-six. Additionally, in embodiments, the optical fibers 12 may include an outer ink layer, which may further allow for arrangement of the optical fibers 12 in a color-coded pattern. For example, one convention for color-coding the optical fibers 12 is to arrange them in the following color sequence: blue, orange, green, brown, slate, white, red, black, yellow, violet, rose, and aqua. In embodiments containing more than twelve optical fibers 12, the pattern of colors may be repeated. The optical fibers 12 are color-coded in this way to help organize and identify specific fibers 12 when making connections or splices.

In embodiments, the optical fiber ribbon 10 has a first configuration in which the optical fibers 12 are arranged in a substantially planar row, which helps to organize the optical fibers 12 for mass fusion splicing. Further, as will be described more fully below, the optical fibers 12 also can be rolled, curled, or folded into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the optical fibers 12 are only held together intermittently along the length of the optical fiber 12 by a plurality of intermittent bonding regions 14.

In a conventional optical fiber ribbon, the optical fibers are bonded to each other along their entire length to hold them in the planar configuration. According to the present disclosure, however, the optical fibers 12 are bonded intermittently along the length of the optical fiber ribbon 10 so that the optical fibers 12 are not rigidly held in the planar configuration. In between the intermittent bonding regions 14, the optical fibers 12 are not bonded to each other along their length. In this way, the present optical fiber ribbon 10 provides the advantages of a ribbon with respect to fiber organization and mass fusion splicing while also allowing for a more compact cable design.

FIG. 1 depicts the intermittent bonding regions 14 arranged widthwise across all the optical fibers 12. In embodiments, the bonding regions 14 may be provided on one or both sides of the optical fiber ribbon 10. For example, the bonding regions 14 may be on both sides of the optical fiber ribbon 10 at a particular location along the length, or for example, the bonding regions 14 may alternate sides (e.g., one or more bonding regions 14 on one side of the optical fiber ribbon 10 followed by one or more bonding regions 14 on the opposite side of the optical fiber ribbon 10). Still further, in an example, all of the bonding regions 14 are provided on the same side of the optical fiber ribbon 10.

Additionally, in embodiments, the bonding regions 14 can be continuous or discontinuous across the width of the optical fiber ribbon 10. For example, in embodiments, each bonding region 14 is comprised of one or more bonds holding adjacent optical fibers 12 together with the bonds being contiguous with each other, or in other embodiments, each bonding region 14 is comprised of one or more bonds holding adjacent optical fibers 12 together without the bonds being contiguous with each other.

In other embodiments, the intermittent bonding regions 14 may be staggered across subsets of the optical fibers 12 in the optical fiber ribbon 10. For example, within an intermittent bonding region 14, as few as two of the optical fibers 12 may be bonded together at a particular location along the length of the optical fiber ribbon 10. Notwithstanding the number and location of bonds across the width, the layer of material containing a colorant (described below) may extend across the entire width of the optical fiber ribbon in the bonding region 14 for identification purposes.

Figure 2:
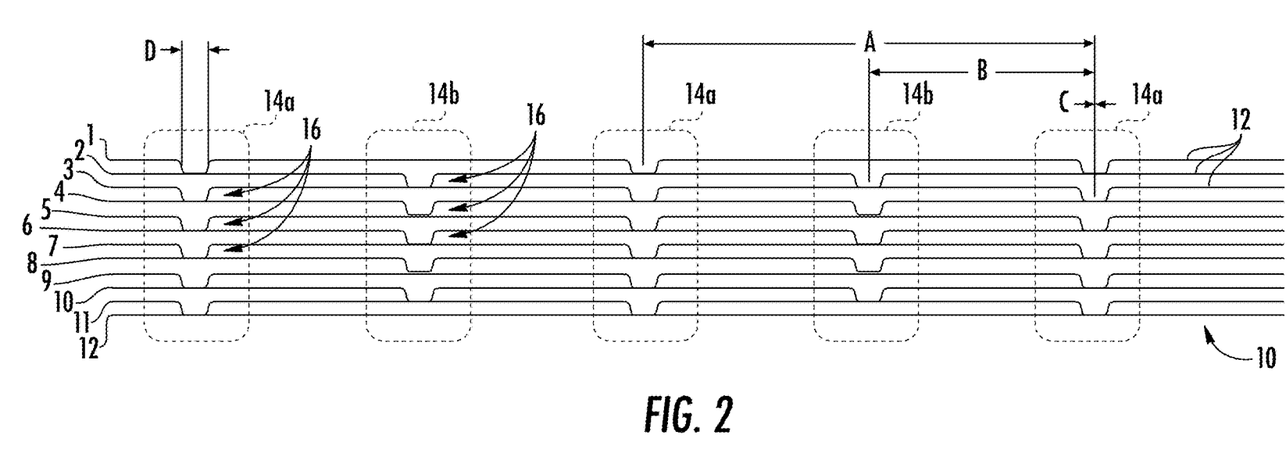
FIG. 2 depicts an exemplary pattern for bonding regions of the optical fiber ribbon, according to an exemplary embodiment.
Figure 3:
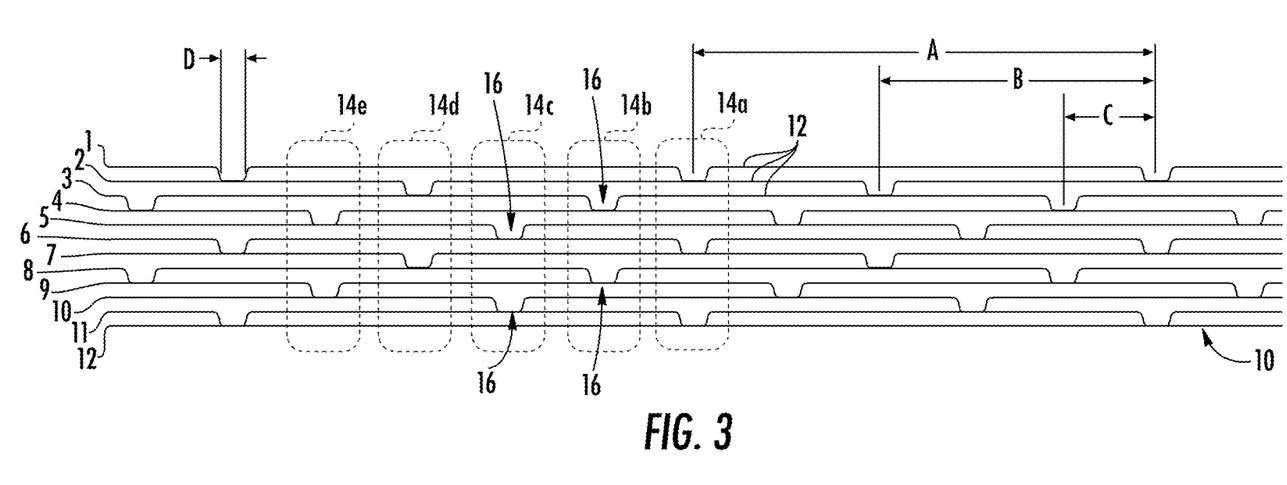
FIG. 3 depicts another exemplary pattern for bonding regions of the optical fiber ribbon, according to an exemplary embodiment.

FIGS. 2 and 3 provide example bonding patterns for bonds 16 between optical fibers 12 of the intermittent bonding regions 14. For the purposes of describing the bonding patterns in FIGS. 2 and 3, the optical fibers are numbered 1-12 going from top to bottom with respect to the orientation of those figures. For additional reference, the bonds between optical fibers are referred to as odd or even. In the embodiments depicted in which there are twelve optical fibers, there are eleven bonds between the optical fibers, and thus, the odd bonds are the first (between optical fibers 1-2), third (3-4), fifth (5-6), seventh (7-8), ninth (9-10), and eleventh (11-12). The even bonds are the second (2-3), fourth, (4-5), sixth (6-7), eighth (8-9), and tenth (10-11). The number of bonds varies based on the number of optical fibers. In particular, the number of bonds between optical fibers is one less than the number of optical fibers.

FIG. 2 depicts an embodiment of a bonding pattern in which the bonds 16 of each bonding region 14 are provided in an alternating pattern of bonding regions 14a, 14b. In the first bonding region 14a, the following odd pairs of optical fibers 12 are bonded to each other: 1-2, 3-4, 5-6, 7-8, 9-10, and 11-12. In the second bonding region 14b, the even pairs of optical fibers 12 are bonded to each other: 2-3, 4-5, 6-7, 8-9, and 10-11.

FIG. 3 depicts an embodiment in which the bonds 16 of each bonding region 14 are staggered along the length of the optical fibers 12. The bonds 16 between optical fibers 12 are provided in a repeating pattern. In a first bonding region 14a, the following optical fibers 12 are bonded to each other: 1-2, 6-7, and 11-12. In a second bonding region 14b, the following optical fibers 12 are bonded to each other: 3-4 and 8-9. In a third bonding region 14c, the following optical fibers 12 are bonded to each other: 5-6 and 10-11. In a fourth bonding region 14d, the following optical fibers 12 are bonded to each other: 2-3 and 7-8. In a fifth bonding region 14e, the following optical fibers 12 are bonded to each other: 4-5 and 9-10. The pattern of bonding regions 14 is repeated 14a, 14b, 14c, 14d, 14e along the length of the optical fiber ribbon 10. Within one period of the repeating pattern, each optical fiber 12 is bonded to its one (in the case of edge fibers) or two adjacent optical fibers 12.

FIGS. 2 and 3 represent intermittent bonds 16 made between optical fibers 12. The bonds 16 are provided in repeating patterns of bonding regions 14. FIG. 2 depicts alternating bonding regions 14a, 14b, and FIG. 3 depicts a pattern of five repeating bonding regions 14a-14e. In embodiments, the bonding regions may have as few as one bond 16 between two optical fibers 12 or as many bonds 16 as the number of optical fibers 12 divided by two (e.g., up to six bonds in a bonding region 14 for twelve optical fibers 12, such as shown in bonding region 14a of FIG. 2). In other embodiments, the bonding regions may have as many bonds as necessary to join each optical fiber 12 to its adjacent optical fiber or fibers 12 at the same longitudinal location (e.g., eleven bonds 16 to join twelve optical fibers 12).

As can be seen in FIGS. 2 and 3, the spacing between bonding regions 14 is denoted by intervals A, B, and C. Interval A is the spacing between repeating elements, such as the spacing between a bonding region 14a and the next bonding region 14a. In embodiments, interval A is from 20 mm to 100 mm. Interval B is the spacing between adjacent even and odd bonds, such as the distance between the bond 1-2 and bond 2-3. In FIG. 2, interval B is the midpoint of interval A, i.e., B=0.5A, which is 10 mm to 50 mm in embodiments, because the even and odd bonds are alternated. In FIG. 3, interval B is the midpoint as shifted by interval C, which is the distance between even bonds or odd bonds (e.g., distance between bond 1-2 and bond 3-4 or between bond 2-3 and bond 4-5). In embodiments, interval C is from 0 mm to 20 mm. In FIG. 2, interval C is 0 mm because all the odd bonds are in the same bonding region 14a and all the even bonds are in the same bonding region 14b. Thus, in the bonding pattern of FIG. 2, interval B is at the midpoint of interval A (B=0.5A). In FIG. 3, interval C is not 0 mm, and the bonding pattern is created by shifting each successive odd or even bond by interval C. Thus, the odd and even bonds form a stepped pattern across the bonding regions 14a-14e. In this way, interval B becomes shifted from the midpoint of interval A by interval C (B=0.5A+C). In embodiments, interval B is from 0.5A to 0.75A when taking into account shifting by interval C.

FIGS. 2 and 3 also depict a dimension D, which is the length of each bond 16. In embodiments, the length D is from 1 mm to 10 mm. Embodiments of the bonds 16 will be described in greater detail in relation to FIGS. 4 and 5, below.

Figure 4:
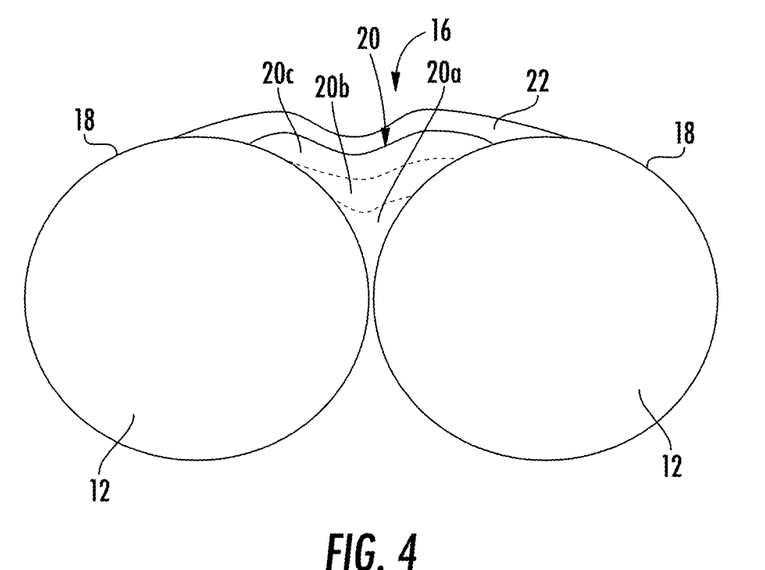
FIG. 4 depicts a longitudinal cross-sectional view of a bond between two optical fibers of the optical fiber ribbon, according to another exemplary embodiment.

FIG. 4 depicts a longitudinal cross-section of a bond 16 between two optical fibers 12. As can be seen in FIG. 4, the optical fibers 12 have outer surfaces 18 that are in close proximity or are touching each other. The bond 16 joining the two optical fibers 12 is comprised of at least two materials. In the embodiment of FIG. 4, a first material 20 is deposited on and is in contact with the outer surfaces 18 of the optical fibers 12. A second material 22 is deposited on the first material 20. In embodiments, the second material 22 may also be in contact with the outer surfaces 18 of the optical fibers 12. In various embodiments, the first material 20 is deposited to provide at least a first functionality, and the second material 22 is deposited to provide at least a second functionality.

For example, in the embodiment shown in FIG. 4, the first material 20 is configured to bond the optical fibers 12 to each other, whereas the second material 22 is deposited for color-coding of the optical fiber ribbon 10 among a plurality of optical fiber ribbons in an optical fiber cable.

In an embodiment, the first material 20 for bonding the optical fibers 12 together is a curable formulation (e.g., UV-curable formulation) comprising one or more urethane acrylate oligomers, one or more acrylate monomers, one or more photoinitiators, an antioxidant, and other typical processing additives. In embodiments, the first material 20 has a Young's modulus of from 1 MPa to 50 MPa, an elongation at break greater than 200%, and/or a viscosity lower than 8000 cP at 25° C. Further, in embodiments, the first material 20 has a glass transition temperature of from −40° C. to 50° C.

In an embodiment, the second material 22 for providing a color layer is a curable formulation (e.g., UV-curable formulation) comprising one or more urethane acrylate oligomers, one or more acrylate monomers, one or more photoinitiators, an antioxidant, and other typical processing additives. In embodiments, the second material 22 has a Young's modulus of from 100 MPa to 1500 MPa, an elongation at break of from 20% to 200%, and/or a viscosity lower than 30000 cP at 25° C. Further, in embodiments, the second material 22 has a glass transition temperature of from 0° C. to 100° C.

In other embodiments, the first material 20 and the second material 22 can be selected to have additional functionality or properties. For example, the second material 22 as the outer material may be selected to have a low coefficient of friction to allow for the optical fiber ribbons to slide past each other more easily. Further, one of the first material 20 or the second material 22 may be selected to be substantially clear (e.g., transmit at least 70%, at least 80%, or at least 90% of light having a wavelength in the range of 400 nm to 800 nm), whereas the other of the first material 20 or the second material 22 is selected to contain a colorant, such as a dye, an ink, or a pigment. In this way, one material can provide color identification without the other material obscuring that function.

Figure 5:
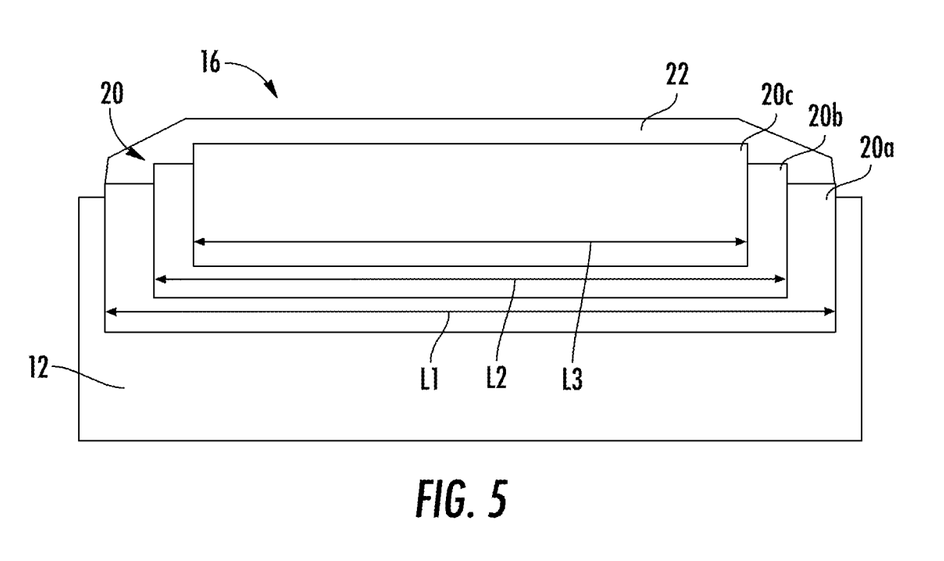
FIG. 5 depicts a lateral cross-sectional view of a bond between two optical fibers of the optical fiber ribbon, according to a further exemplary embodiment.

As can be seen in FIG. 4, the first material 20 is deposited in multiple layers. In the embodiment depicted, the first material 20 is deposited in three layers 20a, 20b, 20c. FIG. 5 depicts a lateral cross-sectional view of the bond 16 to depict the layers 20a, 20b, 20c of the first material 20. In the embodiment of FIG. 5, the layers 20a, 20b, 20c have decreasing lengths to form a stepped or tapered thickness of the first material 20. In embodiments, the first material 20 is deposited in a first layer 20a having a length $L_1$ followed by a second layer 20b having a length $L_2$ ($L_2<L_1$), which is followed by a third layer 20c having a length $L_3$ ($L_3<L_2$).

In the embodiment depicted in FIG. 5, the second material 22 is deposited in a layer having a length that is substantially equal to the length $L_1$ of the first layer 20a of the first material 20 (in which case dimension D of FIGS. 2 and 3 is equal to length $L_1$). However, in other embodiments, the length of the layer of the second material 22 may be shorter than or longer than the length $L_1$ of the first layer 20a of the first material 20 (in which case dimension D of FIGS. 2 and 3 is equal to length $L_1$ or the length of the second material 22, respectively).

Further, while the first material 20 is depicted as having multiple layers, the second material 22 could instead have multiple layers, or both the first material 20 and the second material 22 could each have multiple layers. For example, in an embodiment, the first material 20 is a color layer and is applied directly in contact with the outer surface 18 of the optical fibers 12. Thereafter, the second material 22 is applied in multiple layers over the first material 20 to bond the adjacent optical fibers 12 to each other.

The first material 20 and the second material 22 can be applied via a variety of suitable application techniques. In a particular embodiment, the first material 20 and the second material 22 are applied via printing, in particular inkjet printing. In such an embodiment, the first material 20 and the second material 22 are applied in circular dots or elongate dashes. FIGS. 6A-D provides a schematic depiction of how the first material 20 and the second material 22 are applied to the optical fibers 12. In particular, FIGS. 6A-6D schematically depict the formation of a bond 16 between only two optical fibers 12 of a ribbon 10-; although, the formation of the bond 16 between the remaining fibers 12 would occur in substantially the same as the depiction in FIGS. 6A-6D.

Figure 6A:
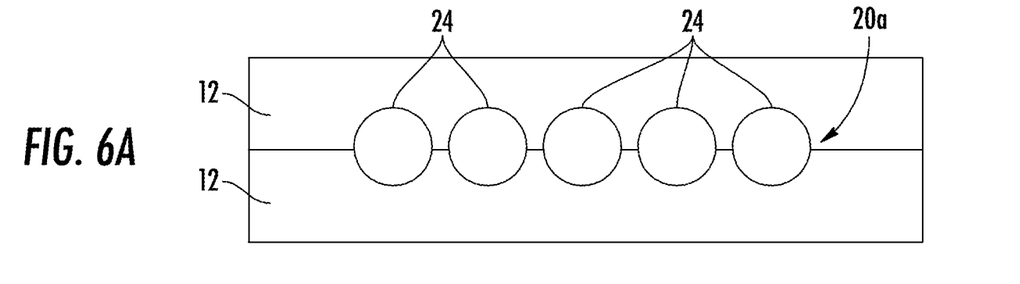
FIGS. 6A-6D schematically depict a process of intermittently bonding adjacent optical fibers, according to an exemplary embodiment.
Figure 6B:
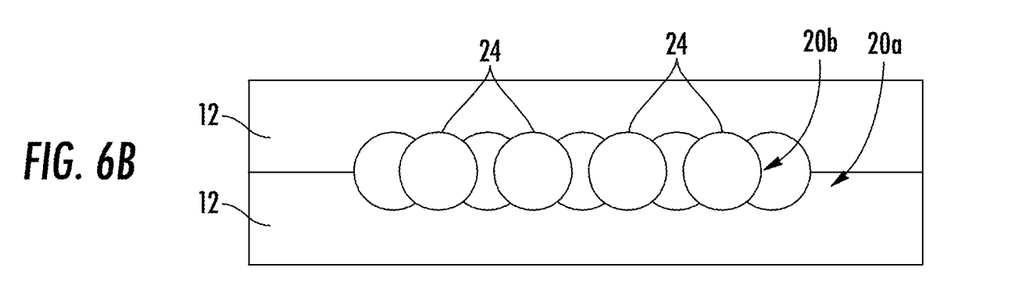
Figure 6C:
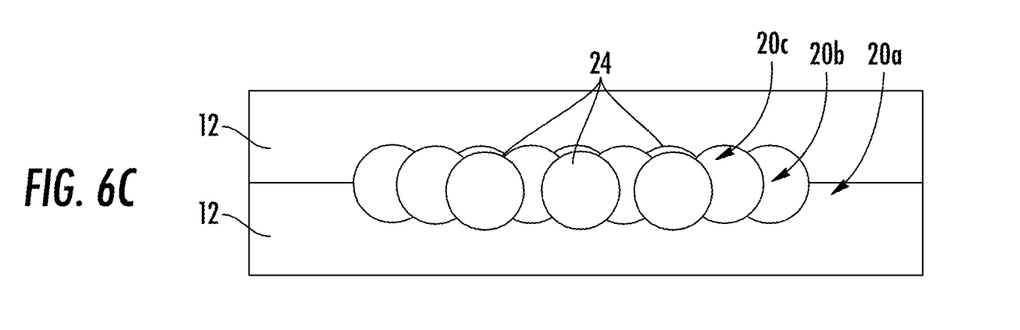
Figure 6D:
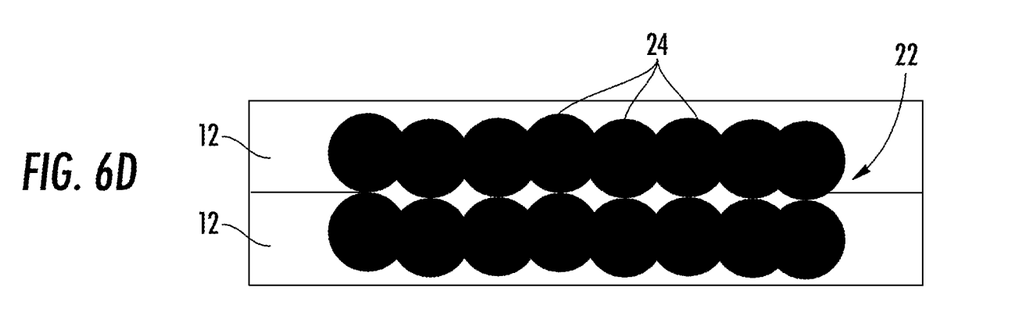

In a first step depicted in FIG. 6A, a plurality of dots 24 of the first material 20 are printed in the interstice between the two optical fibers 12. In embodiments, the dots 24 are substantially circular and have a diameter of from 50 µm to 350 µm. Further, in embodiments, the dots have a thickness of 5 µm to 100 µm. In a second step depicted in FIG. 6B, another layer of dots of the first material 20 is printed over the first layer. As can be seen in the embodiment of FIG. 6B, the second layer of dots 24 does not extend over the same length as the first layer of dots 24, which creates the stepped thickness discussed in relation to FIG. 5. In a third step shown in FIG. 6C, a third layer of dots 24 is printed over the second layer, and in embodiments, the third layer does not extend the same length as the second layer, creating another step in the thickness of the bond 16. A fourth step is depicted in FIG. 6D in which the second material 22 is applied over the first material 20. In the case where the second material 22 provides color identification, the dots 24 may extend widthwise and lengthwise over a greater area than the dots 24 of the first material 20. In embodiments, the subsequent layers are applied over preceding layers after the preceding layers have fully dried or cured. In other embodiments, the subsequent layers are applied over the preceding layers before the preceding layers fully dry or cure so that the layers/materials intermix at the interface between the layers/materials, which provides good adhesion between the layers/materials.

The color of the second material 22 (or first material 20 if selected to carry the colorant) can vary among the bonding regions 14. For example, FIG. 1 shows three bonding regions 14 over a span of an optical fiber ribbon 10. The bonding regions 14 are patterned in embodiments in order to identify the group of ribbons to which a particular optical fiber ribbon 10 belongs as well as identifying the specific ribbon 10 within the group. For example, an optical fiber cable containing 864 optical fibers may contain six groups of ribbons with each group having 144 fibers. The 144 fibers may be arranged as twelve ribbons 10, each having twelve optical fibers 12 (that is, [twelve optical fibers in a ribbon]×[twelve ribbons in a group]×[six groups in a cable]=864 optical fibers). Using the intermittent bonding regions 14, the colors of two consecutive bonding regions 14 can be used to identify ribbon group, and the color of the following bonding region 14 can be used to identify the specific ribbon of the group.

Figure 7:
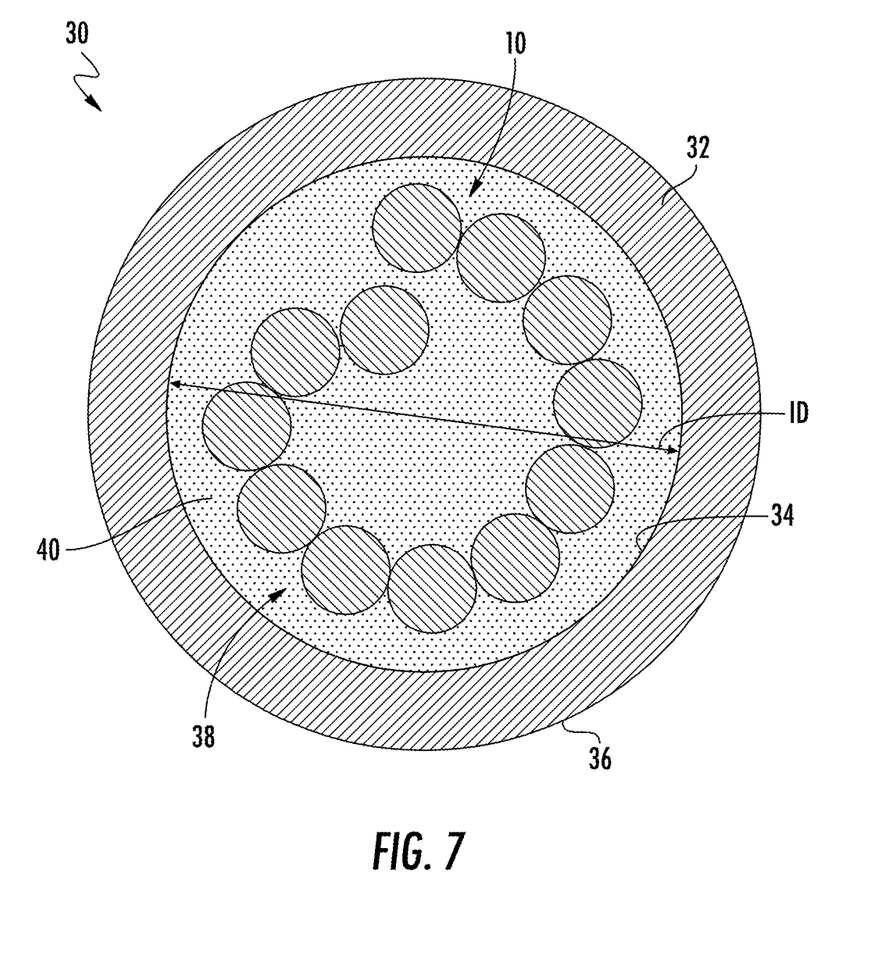
FIG. 7 depicts a longitudinal cross-section of an optical fiber cable including an intermittently bonded optical fiber ribbon, according to an exemplary embodiment.

As mentioned above, the intermittently bonded optical fiber ribbon 10 allows for smaller cable diameters and/or higher fill ratios. FIG. 7 depicts an exemplary embodiment of an optical fiber cable 30 containing an intermittently bonded optical fiber ribbon 10. The optical fiber cable 30 has a cable jacket 32 with an inner surface 34 and an outer surface 36. In embodiments, the outer surface 36 is the outermost surface of the optical fiber cable 30. The inner surface 34 defines a central bore 38 containing the optical fiber ribbon 10. The central bore 38 has a diameter, which is the inner diameter ID of the cable jacket 32. As shown in FIG. 7, the central bore 38 is also filled with filling material 40, which may be, e.g., strength members (such as aramid, cotton, basalt, and/or glass yarns), water blocking gels or powders, and/or fire retardant materials, among others.

Conventionally, the inner diameter of the cable jacket had to be at least as large as the width of the optical fiber ribbon in the planar configuration in order to accommodate the entire optical fiber ribbon. However, this meant that much of the interior space of the optical fiber jacket went unfilled. According to the present disclosure, smaller cable diameters and/or higher fill ratios are achievable by reducing the maximum cross-sectional dimension of the optical fiber ribbon 10. In particular, by rolling or curling the optical fiber ribbon 10 into, e.g., a circle or spiral, the inner diameter ID of the cable 30 can be smaller, providing an overall smaller and more highly filled cable design. Notwithstanding, the optical fiber ribbon 10 can still be removed from the optical fiber cable 30, flattened into the planar configuration, and then easily be mass fusion spliced like a conventional optical fiber ribbon. For the sake of simplicity, a single optical fiber ribbon 10 was shown in the optical fiber cable 30. However, in other embodiments, the optical fiber cable 30 may contain several tens or hundreds of optical fiber ribbons 10. Further, such optical fiber ribbons 10 may be arranged in one or more buffer tubes within the central bore 38 of the cable jacket 32.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:
   a plurality of optical fibers arranged adjacently to each other;
   a plurality of bonding regions intermittently spaced along a length of the optical fiber ribbon;
   wherein, at each bonding region, at least one bond is formed between two optical fibers of the plurality of optical fibers;
   wherein the at least one bond comprises a first material applied to outer surfaces of the two optical fibers and a second material applied over the first material, the first material being different from the second material; and
   wherein at least one of the first material or the second material comprises a colorant configured to identify the optical fiber ribbon.

2. The optical fiber ribbon of claim 1, wherein the first material comprises a first layer and a second layer and wherein a length of the first layer is greater than a length of the second layer.

3. The optical fiber ribbon of claim 2, wherein the first layer and the second layer comprise a plurality of inkjet printed dots having a thickness of from 5 µm to 100 µm.

4. The optical fiber ribbon of claim 1, wherein the first material covers a first area of each bonding region, wherein the second material covers a second area of each bonding region, and wherein the second area is greater than the first area.

5. The optical fiber ribbon of claim 4, wherein the second material comprises the colorant.

6. The optical fiber ribbon of claim 1, wherein the first material covers a first area of each bonding region, wherein the second material covers a second area of each bonding region, and wherein the first area is greater than the second area.

7. The optical fiber ribbon of claim 6, wherein the first material comprises the colorant and wherein the second material is substantially clear.

8. The optical fiber ribbon of claim 1, wherein, in a first bonding region of the plurality of bonding regions, the at least one bond comprises a first number of bonds less than or equal to the plurality of optical fibers divided by two.

9. The optical fiber ribbon of claim 8, wherein, in a second bonding region of the plurality of bonding regions, the at least one bond comprises a second number of bonds less than or equal to the first number of bonds.

10. The optical fiber ribbon of claim 9, wherein the plurality of bonding regions comprises alternating first bonding regions and second bonding regions.

11. The optical fiber ribbon of claim 10, wherein the first bonding regions are spaced apart by a first interval of 20 mm to 100 mm.

12. The optical fiber ribbon of claim 11, wherein the second bonding regions are spaced apart from the first bonding regions by a second interval that is 50% to 75% of the first interval and wherein successive even bonds and successive odd bonds are spaced apart by a third interval of from 0 mm to 20 mm.

13. An optical fiber cable, comprising:
a cable jacket having an inner surface and an outer surface, the inner surface defining a central bore and the outer surface defining the outermost surface of the cable,
an optical fiber ribbon according to claim 1 disposed within the central bore;
wherein the optical fiber ribbon is in the second longitudinal cross-sectional configuration within the central bore.

14. A method of preparing an optical fiber ribbon, comprising:
arranging a plurality of optical fibers adjacent to each other along a length of the optical fiber ribbon;
intermittently depositing a first material into at least one interstice between two adjacent optical fibers of the plurality of optical fibers to create bonding regions along the length of the optical fiber ribbon;
intermittently depositing a second material over the first material in the bonding regions;
wherein the first material is different from the second material.

15. The method of claim 14, wherein the steps of intermittently depositing comprise continuously inkjet printing the first material and the second material onto the plurality of optical fibers.

16. The method of claim 14, wherein the second material is intermittently deposited on the first material before the first material fully cures so that the first material and second material intermix.

17. The method of claim 14, wherein the step of intermittently depositing the first material comprises depositing a first layer having a first length and depositing a second layer over the first layer, the second layer having a second length that is less than the first length.

18. The method of claim 14, wherein the first material covers a first area and the second material covers a second area, wherein the second area is larger than the first area, and wherein the second material comprises a colorant.

19. The method of claim 14, the first material covers a first area and the second material covers a second area, wherein the first area is larger than the second area, wherein the first material comprises as colorant, and wherein the second material is substantially clear.

20. An optical fiber ribbon, comprising:
a plurality of optical fibers arranged adjacently to each other, wherein each of the plurality of optical fibers comprises a respective colorant layer;
a plurality of bonding regions intermittently spaced along a length of the optical fiber ribbon;
wherein, at each bonding region, at least one bond is formed between two optical fibers of the plurality of optical fibers;
wherein the at least one bond comprises:
a first layer applied to outer surfaces of the two optical fibers such that the first layer extends between the two optical fibers; and
a second layer applied over the first layer, wherein the first layer and the second layer are formed from different materials; and
wherein at least one of the first layer or the second layer comprises a colorant configured to identify the optical fiber ribbon.

* * * * *